United States Patent
Khan et al.

(10) Patent No.: US 12,088,717 B2
(45) Date of Patent: Sep. 10, 2024

(54) SYSTEMS AND METHODS FOR AI/MACHINE LEARNING-BASED BLOCKCHAIN VALIDATION AND REMEDIATION

(71) Applicant: Verizon Patent and Licensing Inc., Basking Ridge, NJ (US)

(72) Inventors: Ahmed A. Khan, Plano, TX (US); Mohammed A. Qaudeer, Tampa, FL (US); Abdul Raheem, Irving, TX (US); Rasmi Ranjan Samal, Hyderabad (IN); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 345 days.

(21) Appl. No.: 17/509,479

(22) Filed: Oct. 25, 2021

(65) Prior Publication Data

US 2023/0127913 A1   Apr. 27, 2023

(51) Int. Cl.
*H04L 9/32* (2006.01)
*H04L 9/08* (2006.01)
*H04L 9/14* (2006.01)
*H04L 9/00* (2022.01)

(52) U.S. Cl.
CPC .............. *H04L 9/32* (2013.01); *H04L 9/0822* (2013.01); *H04L 9/14* (2013.01); *H04L 9/50* (2022.05)

(58) Field of Classification Search
CPC . H04L 9/32; H04L 9/0822; H04L 9/14; H04L 9/50; H04L 9/3297; H04L 2209/84
See application file for complete search history.

(56) References Cited

U.S. PATENT DOCUMENTS

| | | | |
|---|---|---|---|
| 9,818,239 B2* | 11/2017 | Pal | G08B 25/001 |
| 9,984,511 B1* | 5/2018 | Sankovsky | G07C 5/0816 |
| 10,795,752 B2* | 10/2020 | Li | G06F 11/079 |
| 10,824,500 B1* | 11/2020 | Shoemaker | G07C 5/12 |
| 10,997,607 B1* | 5/2021 | Leise | G07C 5/008 |
| 11,321,970 B2* | 5/2022 | Wright | G09B 19/14 |
| 11,399,268 B2* | 7/2022 | Ahmed | G07C 5/008 |
| 11,757,663 B1* | 9/2023 | Woerner | G06F 21/44 |
| | | | 713/178 |

(Continued)

OTHER PUBLICATIONS

Yin et al.; "A Blockchain-Based Incremental Update Supported Data Storage System for Intelligent Vehicles", May 2021, IEEE Transactions on Vehicular Technology, vol. 70, No. 5, pp. 4880-4893 (Year: 2021).*

(Continued)

*Primary Examiner* — Matthew Smithers

(57) ABSTRACT

A system described herein may utilize artificial intelligence/machine learning ("AI/ML") or other suitable techniques to automatically identify blocks added to or proposed to be added to a blockchain, with conflicting and/or otherwise incompatible information, and to automatically remediate the blockchain based on the identified conflict and/or incompatibility. The model may associate different types of conflicts and/or incompatibilities with different types of remedial measures. The remedial measures may include the rejection of a proposed block, recording a new block that takes precedence or priority over a previously recorded block, or other suitable remedial measures.

20 Claims, 12 Drawing Sheets

(56) References Cited

U.S. PATENT DOCUMENTS

| | | | |
|---|---|---|---|
| 2014/0279304 A1* | 9/2014 | Lall | G06F 16/24564 |
| | | | 705/30 |
| 2018/0211252 A1* | 7/2018 | Lintner | G06Q 20/401 |
| 2018/0342036 A1* | 11/2018 | Zachary | H04L 9/3239 |
| 2019/0130480 A1* | 5/2019 | Brewbaker | G06Q 40/03 |
| 2019/0287140 A1* | 9/2019 | Arora | G06F 16/951 |
| 2019/0334726 A1* | 10/2019 | Kelly | H04L 9/3247 |
| 2019/0334920 A1* | 10/2019 | Kelly | H04L 9/3239 |
| 2020/0169534 A1* | 5/2020 | Fritz | H04L 63/0272 |
| 2020/0186510 A1* | 6/2020 | Kursun | H04L 63/1466 |
| 2020/0272619 A1* | 8/2020 | Alferov | H04L 9/3297 |
| 2020/0313907 A1* | 10/2020 | Mondello | H04L 9/30 |
| 2021/0055442 A1* | 2/2021 | Rangarajan | H04L 63/12 |
| 2021/0144158 A1* | 5/2021 | Gerards | H04L 9/0618 |
| 2021/0192346 A1* | 6/2021 | Taylor | G06N 3/088 |
| 2021/0250165 A1* | 8/2021 | Crawford | H04L 9/3247 |
| 2021/0288814 A1* | 9/2021 | Green | G06N 20/00 |
| 2021/0352142 A1* | 11/2021 | Jayaram | G06Q 20/389 |
| 2021/0375409 A1* | 12/2021 | Romantsov | H04L 67/1097 |
| 2022/0036465 A1* | 2/2022 | Fields | H04L 9/32 |
| 2022/0126864 A1* | 4/2022 | Moustafa | G06T 1/0007 |
| 2022/0188717 A1* | 6/2022 | Daley | H04L 9/3247 |
| 2022/0335340 A1* | 10/2022 | Moustafa | G06F 11/3003 |
| 2022/0405750 A1* | 12/2022 | Fallah | H04L 9/14 |
| 2022/0407889 A1* | 12/2022 | Narigapalli | H04L 63/101 |
| 2023/0048368 A1* | 2/2023 | Pirwani | B60W 50/0205 |
| 2023/0169517 A1* | 6/2023 | Garner, IV | G06Q 40/02 |
| | | | 705/35 |

OTHER PUBLICATIONS

Pokhrel et al.; "Federated Learning With Blockchain for Autonomous Vehicles: Analysis and Design Challenges", Aug. 2020, IEEE Transactions on Communications, vol. 68, No. 8, pp. 4734-4746. (Year: 2020).*

* cited by examiner

SYSTEMS AND METHODS FOR AI/MACHINE LEARNING-BASED BLOCKCHAIN VALIDATION AND REMEDIATION

BACKGROUND

Blockchains provide a secure, decentralized, immutable mechanism by which information may be recorded by and accessible to authorized entities, such as nodes or other devices or systems that have access to such blockchains. Some blockchains may offer the opportunity for multiple different entities, organizations, individual users, etc. to record information to the blockchains.

DETAILED DESCRIPTION OF EXAMPLE EMBODIMENTS

Figure 1A:
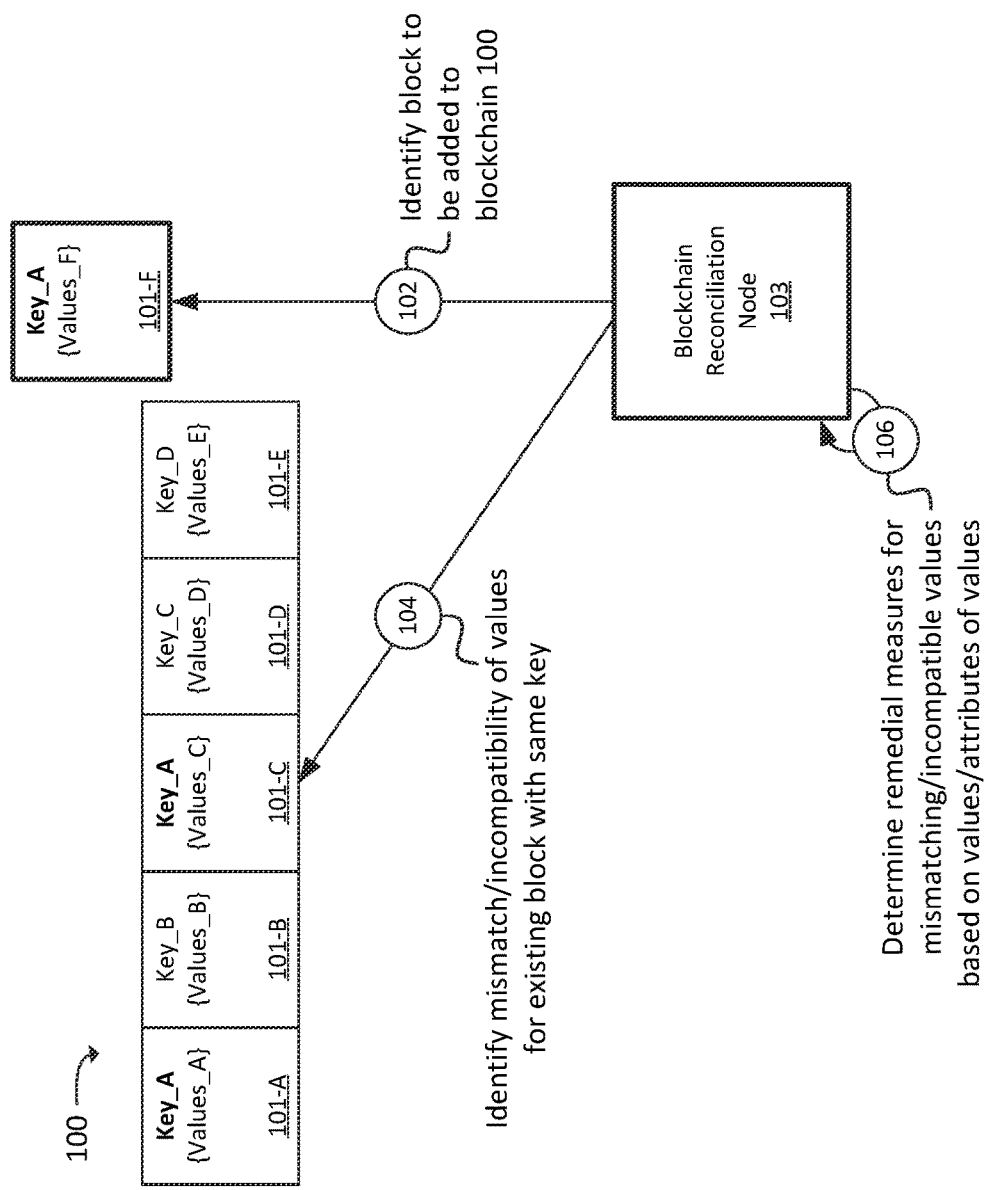
FIG. 1A illustrates an example overview of one or more embodiments described herein.

The following detailed description refers to the accompanying drawings. The same reference numbers in different drawings may identify the same or similar elements.

Some blockchains may offer the opportunity for multiple different entities, organizations, individual users, etc. to record information to the blockchains. In some scenarios, different values for the same attributes, parameters, etc. may be provided, which may result in a mismatch or other type of incompatibility. In such scenarios, an entity that accesses the blockchain may receive or identify incorrect or ambiguous information for a given attribute, parameter, etc. For example, two different entities may record different values for a particular block recorded to a given blockchain, such as different telematics information for the same autonomous vehicle over the same time period, different values for sensor readings associated with the same set of Internet of Things ("IoT") devices in the same location, different prices for the same transaction, different statuses for a particular transaction (e.g., "in process," "shipped," "returned," etc.), and/or other types of mismatching or otherwise incompatible values for the same information.

Embodiments described herein provide for a system that utilizes artificial intelligence/machine learning ("AI/ML") or other suitable techniques to automatically identify blocks with conflicting and/or otherwise incompatible information (e.g., blocks that have been recorded to a blockchain and/or blocks that are proposed to be recorded to the blockchain), and to automatically remediate the blockchain based on the identified conflict and/or incompatibility. As discussed herein, different types of conflicts and/or incompatibilities may be associated with different types of remedial measures. For example, some types of conflicts and/or incompatibilities may be associated with a determination that information in a block received from a first entity is valid as compared to information in a block received from a second entity. On the other hand, other types of conflicts and/or incompatibilities may be associated with a determination that information in a block received from the second entity is valid as compared to information in a block received from the first entity. The remedial measures may include the rejection of a proposed block (e.g., which includes conflicting and/or incompatible information) prior to recording the proposed block to the blockchain, recording a new block that takes precedence or priority over a previously recorded block, or other suitable remedial measures. As the particular types of remedial measures based on different types of conflicts and/or incompatibilities may be determined using AI/ML techniques, manual intervention may not be needed to remediate such conflicts and/or incompatibilities. Further, the information stored within the blockchain may be made more reliable based on the remedial measures identified and performed in accordance with some embodiments.

As shown in FIG. 1A, for example, blockchain 100 may include an example set of blocks 101-A through 101-E. Block 101-F may be a block that is proposed to be added to blockchain 100, such as upon validation, verification, approval, etc. by one or more nodes or other entities associated with blockchain 100 that add blocks to blockchain 100 and/or validate the addition of such blocks to blockchain 100.

In the examples described herein, each block 101 is described as including a "key" and a set of "values." In some situations, the key for a given block 101 may be or may include a subset of values of the block. Generally, the same key used in multiple different blocks 101 may indicate that these different blocks 101 pertain to the same item(s), object(s), set(s) of data, etc. Thus, while a key may include one or more values, "keys" and "values" are described separately herein, as mismatches and/or incompatibilities may be detected for blocks having the same key and one or more different values.

Figure 1B:
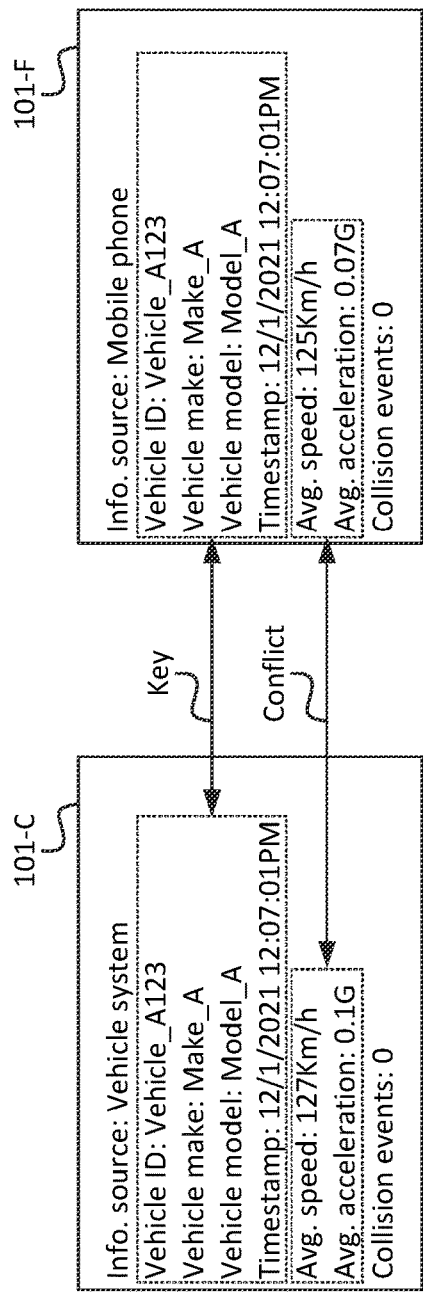
FIGS. 1B and 1C illustrate examples of mismatched information for the same key that may be identified with respect to multiple blocks of a blockchain, in accordance with some embodiments.
Figure 1C:
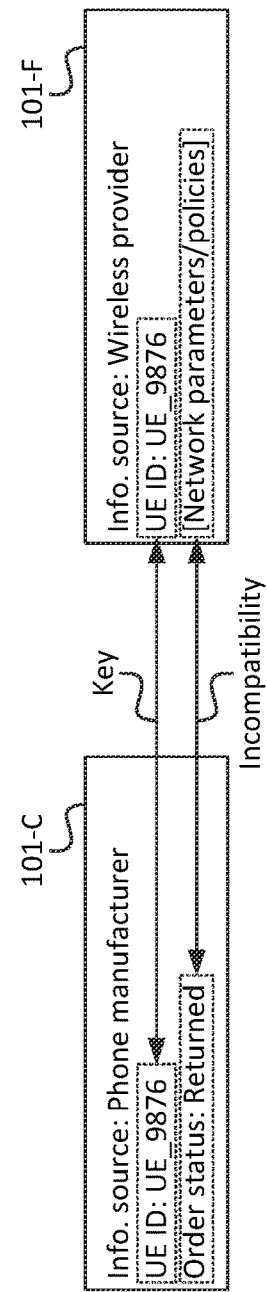

FIGS. 1B and 1C illustrate examples of keys and/or values associated with example blocks 101-C and 101-F (e.g., blocks associated with the same key). As shown in FIG. 1B, for example, blocks 101-C and 101-F may each be associated with a set of values for a set of parameters. The parameters in this example are "Block source," "Vehicle ID," "Vehicle make," "Vehicle model," "Timestamp," "Avg. [average] speed," "Avg. acceleration," and "Collision events." The "Block source" parameter may refer to a device, system, entity, etc. from which a given block was received (and/or from which the information recorded in the block was received). For example, in FIG. 1B, blocks 101-C and 101-F may include vehicle telematics information, and block 101-C may have been received from a system of the vehicle while block 101-F may have been received from a mobile phone associated with (e.g., located in, affixed to, etc.) the vehicle. The key for blocks 101-C and 101-F may be the values for the "Vehicle ID," "Vehicle make," "Vehicle model," and "Timestamp" attributes. In some embodiments, different keys (e.g., different attributes or combinations of attributes) may be identified via AI/ML techniques or other suitable techniques. Keys may also be or may include a hash (or other type of derived or computed value) of some or all of the values.

As further shown, the "Avg. speed" and "Avg. acceleration" parameters may be associated with mismatching values. For example, block 101-C may indicate a value of "127 Km/h" for "Avg. speed" while block 101-F may indicate a value of "125 Km/h" for "Avg. speed." Further, block 101-C may indicate a value of "0.1 G" for "Avg. acceleration" while block 101-F may indicate a value of "0.07 G" for "Avg. acceleration." In other words, a vehicle system and mobile phone, reporting vehicle telematics information for the same vehicle at the same time (or over the same time period), may provide mismatching and/or conflicting information.

In the example shown in FIG. 1C, blocks 101-C and 101-F may include information regarding a particular User Equipment ("UE"), such as a mobile phone, an IoT device, a mobile hotspot, etc. Blocks 101-C and 101-F may further include a "UE ID [identifier]" parameter, which may include an International Mobile Subscriber Identity ("IMSI"), International Mobile Station Equipment Identity ("IMEI"), Internet Protocol ("IP") address, Media Access Control ("MAC") address, Subscription Permanent Identifier ("SUPI"), Globally Unique Temporary Identifier ("GUTI"), and/or other suitable identifier. In this example, the "UE ID" parameter may be the key based on which blocks 101-C and 101-F may be identified as pertaining to the same object, item, etc. (e.g., the particular UE having the UE ID "UE_9876" in this example).

As further shown, blocks 101-C and 101-F may include different sets of parameters and values which may be incompatible. For example, block 101-F, associated with a wireless provider that may provide wireless service to the UE, includes a set of network parameters or policies, which may include provisioning information, a set of Quality of Service ("QoS") policies, information indicating a particular wireless plan, etc. On the other hand, block 101-C may include information indicating that this phone has been returned (e.g., "Order status: Returned"). These values may be incompatible, as block 101-F may indicate that a wireless provider has allocated and/or is otherwise consuming resources for the mobile phone, while block 101-C may indicate that a manufacturer has received the phone back as a return. Thus, an incompatibility may be detected based on values for different parameters that may logically be impossible or otherwise incompatible, even if the values are not a direct mismatch of the same parameter.

Returning to FIG. 1A, Blockchain Reconciliation Node ("BRN") 103 may identify (at 102) that block 101-F is proposed to be added to blockchain 100. For example, BRN 103 may be, may implement, or may be communicatively coupled to a node associated with blockchain 100. In some embodiments, BRN 103 may include an event listener, block explorer, or may implement some other type of technique by which BRN 103 identifies or receives notifications of new blocks added to blockchain 100 (or proposed to be added to blockchain 100).

BRN 103 may, in some embodiments, validate blocks (e.g., "proposed" blocks) prior to addition of the such blocks to blockchain 100, and/or may evaluate or otherwise perform operations described herein on blocks that have been added to blockchain 100. For example, in some embodiments, BRN 103 may identify (at 104) mismatches, conflicts, incompatibilities, and/or other types of inconsistencies between information included in different blocks and may determine and/or perform (at 106) one or more remedial measures to reconcile and/or otherwise remediate such mismatches, conflicts, incompatibilities, inconsistencies, etc. As discussed herein, BRN 103 may generate, modify, and/or otherwise maintain one or more models (e.g., AI/ML models or other suitable types of models) that associate particular types of identified mismatches, conflicts, incompatibilities, inconsistencies, etc. (hereinafter referred to simply as "mismatches") identified in different blocks to particular remedial measures to take with respect to such mismatches. In some embodiments, the AI/ML models may further specify keys based on which blocks may be compared and mismatches identified, and/or BRN 103 may determine keys in some other manner (e.g., keys may be indicated in blocks themselves, BRN 103 may receive or maintain configuration information specifying keys, etc.).

In the example of FIG. 1A, blocks 101-A, 101-C, and 101-F may be associated with the same key ("Key_A"). As noted above, a key may include one or more particular values for one or more parameters specified by information within respective blocks 101. Referring to the example of FIG. 1B, Key_A (e.g., as present in blocks 101-A, 101-C, and 101-F) may include the same (e.g., matching) values for "Vehicle ID," "Vehicle make," and "Vehicle model" parameters. Referring to the example of FIG. 1C, Key_A may include a matching value for a "UE ID" parameter. In other examples, other types of information or parameters within blocks 101 may be used to specify keys associated with the blocks 101.

In some embodiments, blockchain 100 may be arranged such that the latest block (e.g., the most recently recorded block) having a given key is a "correct" or "authoritative" block for that key. For example, block 101-A may include a set of values ("{Values A}") that may be old, outdated, etc. with respect to Values_C that are included in block 101-C with the same Key_A. Thus, BRN 103 and/or some other device or system that access blockchain 100 may search for blocks that include Key_A, and may identify the values present in block 101-C. For example, such a search may be performed in reverse order on blockchain 100, from the most recently recorded block to the oldest block. Additionally, or alternatively, BRN 103 and/or some other device or system may identify multiple or all blocks that match the same Key_A, and may utilize the information therein for any suitable purpose. In any event, scenarios may arise in which the recordation of a block with the same key as other blocks that are already in blockchain 100 may result in a mismatch that may be detected and remediated (at 106) by BRN 103, as noted above.

Assume in this example that the proposed recordation of block 101-F (including {Values_F}) to blockchain 100 may result in a mismatch of values, based on Values_C included in block 101-C with the same key (Key_A) as block 101-F. For example, the mismatch may be based on different values for the same parameters, values for parameters that create one or more logical inconsistencies, values for parameters that do not satisfy a specified pattern or set of constraints, etc. Performing the remedial measures may include reconciling differences between the values included in the different blocks 101-C and 101-F, such as selecting a particular block as "authoritative," generating a new set of values based on a combination of values present in blocks 101-C and 101-F, and/or performing one or more other remedial measures.

Figure 2A:
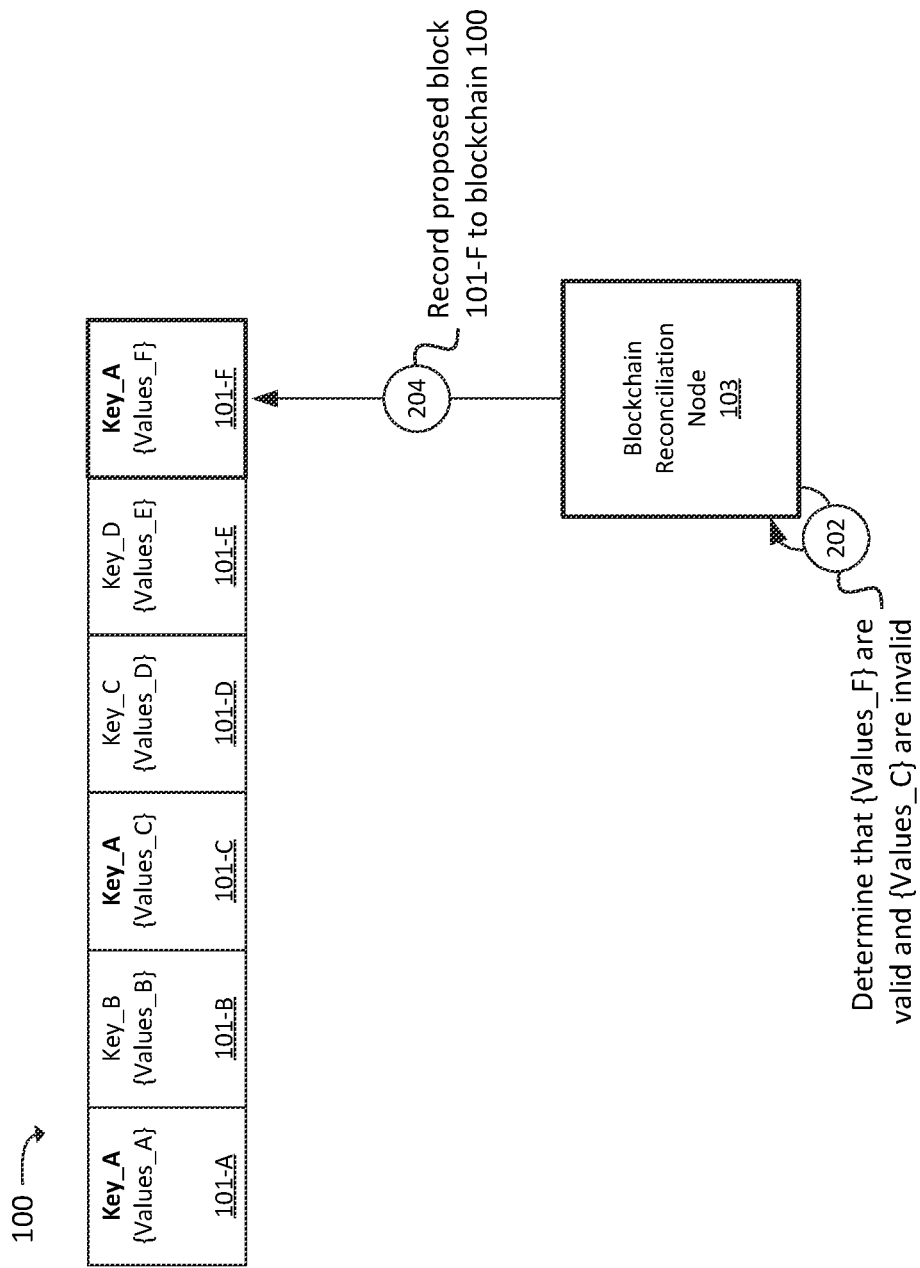
FIGS. 2A, 2B, 3A, and 3B illustrate examples of remedial actions that may be performed when mismatched information for the same key is identified with respect to multiple blocks of a blockchain, in accordance with some embodiments.

As shown in FIG. 2A, for example, BRN 103 may determine (at 202) that the values of block 101-F are valid, and that the values of block 101-C are invalid. As such, the remedial measures taken by BRN 103 may include recording (at 204) proposed block 101-F to blockchain 100. Additionally, or alternatively, BRN 103 may perform one or more actions to facilitate the recordation of block 101-F to blockchain 100, such as participating in a consensus procedure with one or more other nodes (e.g., "voting" or otherwise indicating that block 101-F is valid and/or should otherwise be included in blockchain 100).

Figure 2B:
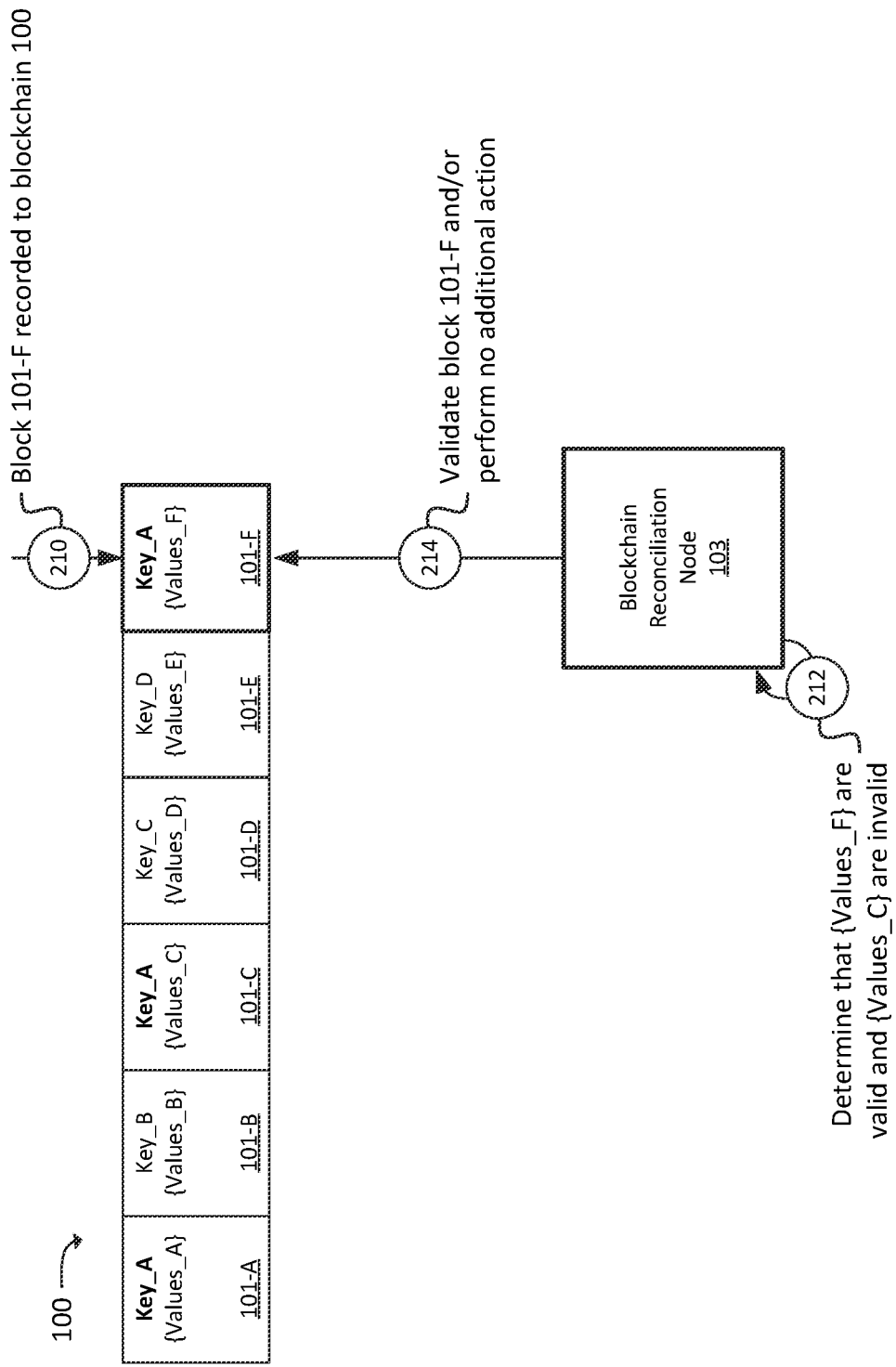

As another example, as shown in FIG. 2B, block 101-F may be recorded (at 210) prior to BRN 103 identifying (at 102) new block 101-F. BRN 103 may, for example, receive a notification of the recordation (at 210) of block 101-F, may "crawl" or search blockchain 100 and identify newly recorded block 101-F, and/or may otherwise identify that block 101-F has been recorded (at 210) to blockchain 100. After block 101-F has been recorded to blockchain 100, BRN 103 may compare values of block 101-F to the values of block 101-C (and/or to one or more other blocks that include the same Key_A, such as block 101-A), and may determine (at 212) that the values of block 101-F are valid (and/or that the values of block 101-C and/or block 101-A are invalid). BRN 103 may accordingly validate (at 214) block 101-F (e.g., indicate validity of block 101-F to one or more nodes associated with blockchain 100) and/or may perform no additional action, as block 101-F has been recorded (at 210) to blockchain 100. In some embodiments, BRN 103 may maintain a record that block 101-F has been validated, and/or that values of block 101-C and/or block 101-C (with the same Key_A as block 101-F) are invalid and/or outdated.

Figure 3A:
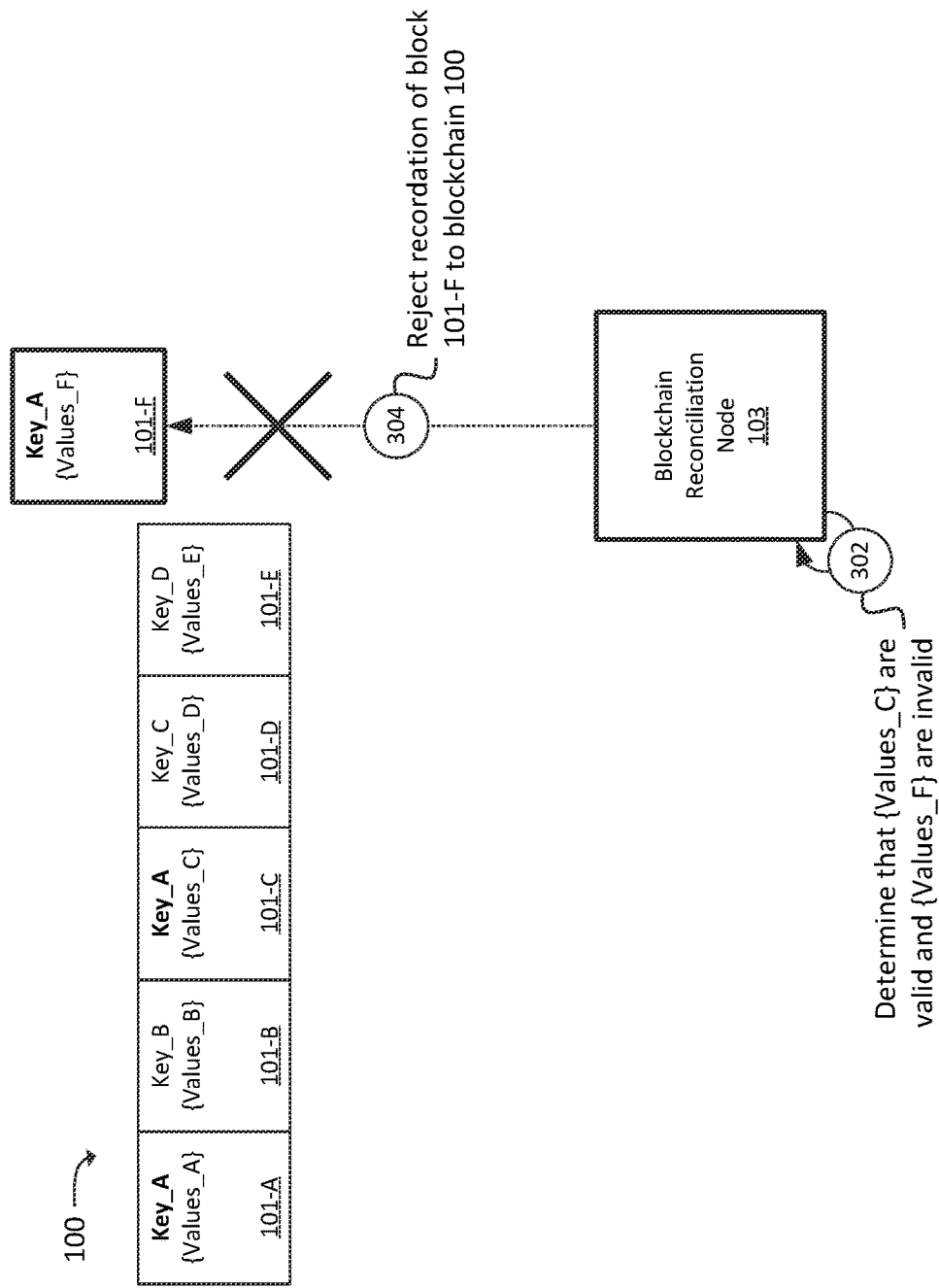

On the other hand, as shown in FIG. 3A, BRN 103 may determine (at 302) that the values in proposed block 101-F are invalid (e.g., the values of block 101-C and/or 101-A, with the same Key_A as block 101-F, are valid). For example, based on the particular type of mismatch between the values of block 101-F and block 101-C, BRN 103 may determine that block 101-C is "authoritative" as compared to block 101-F. As such, BRN 103 may determine that block 101-F should accordingly not be recorded to block 101-F. BRN 103 may therefore reject (at 304) the recordation of block 101-F to blockchain 100. For example, BRN 103 may discard block 101-F without recording block 101-F to blockchain 100, may "vote" or otherwise participate in a consensus procedure with one or more nodes associated with blockchain 100 to indicate that block 101-F should not be recorded, etc.

Figure 3B:
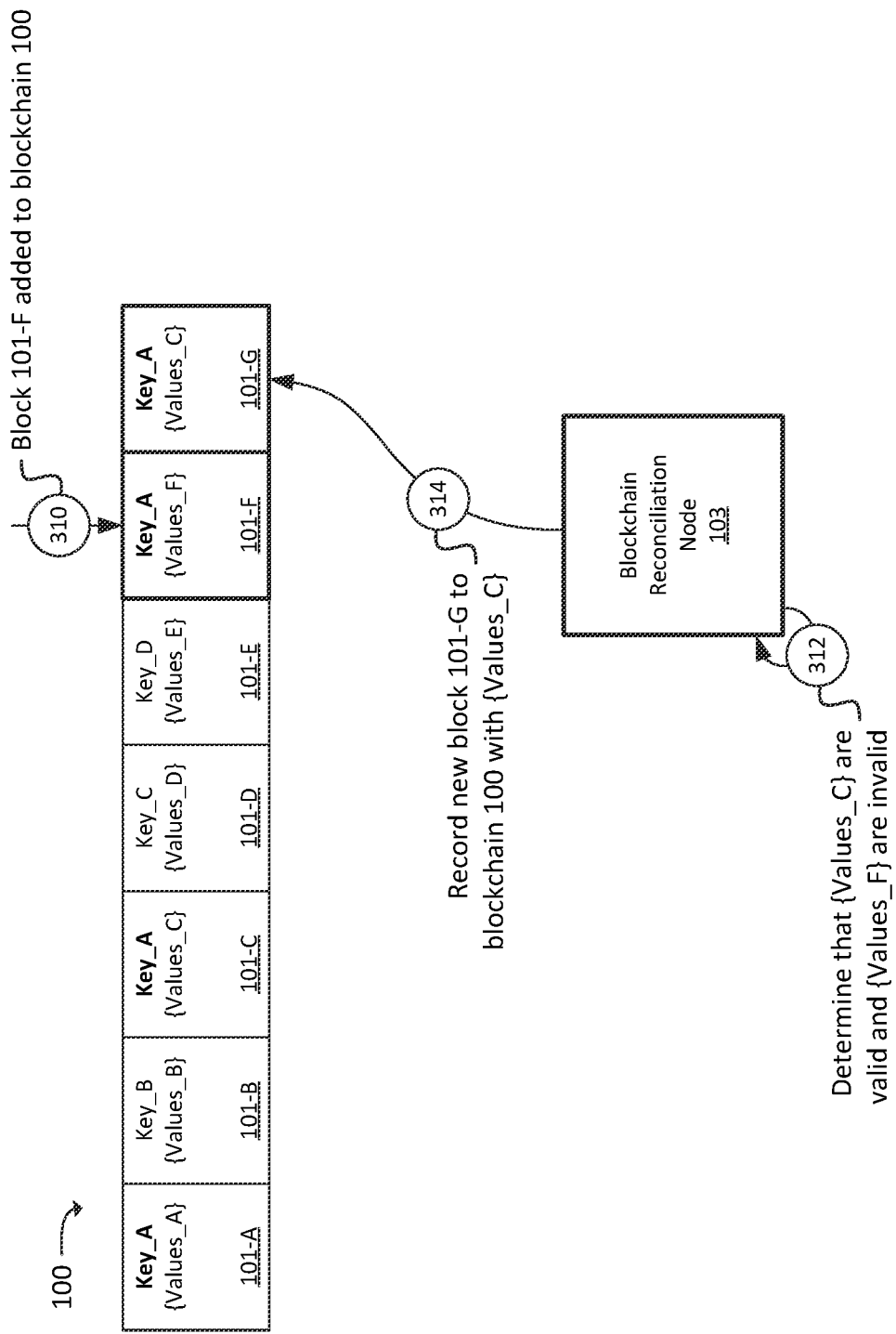

In some embodiments, as shown in FIG. 3B, in situations where block 101-F is recorded (at 310) to blockchain 100 prior to analysis by BRN 103 (e.g., a determination (at 312) that block 101-F includes invalid values and/or that block 101-C includes values that are valid and/or authoritative with respect to the values of block 101-F), BRN 103 may record (at 314) a new block 101-F to blockchain 100. The new block 101-G may include the same values as block 101-C, which were identified (at 312) by BRN 103 as being valid or authoritative. This type of operation may be performed in embodiments where blocks may be added to blockchain 100 without a consensus mechanism, and/or in which blocks may otherwise be added to blockchain 100 prior to analysis and remediation by BRN 103.

Figure 4:
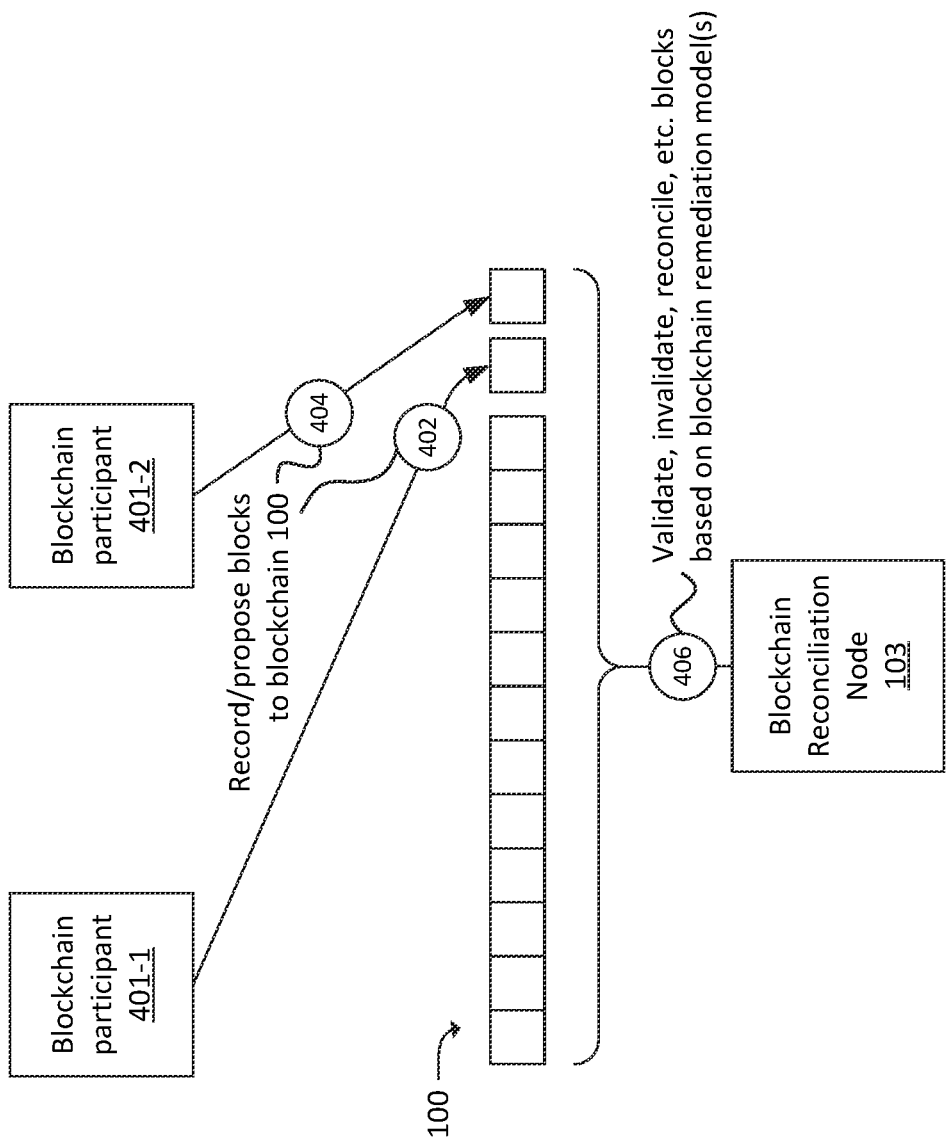
FIG. 4 illustrates an example of the use of blockchain remediation models to validate and/or perform remedial actions with respect to blocks proposed or added to a blockchain by multiple blockchain participants, in accordance with some embodiments.

For example, multiple nodes, participants, etc. may have access to and/or may otherwise be capable of recording blocks to blockchain 100, and BRN 103 may perform one or more reconciliation and/or other remedial measures for blocks associated with the same keys that have mismatching values. As shown in FIG. 4, for example, a first blockchain participant 401-1 (e.g., a node or other type of device or system) may be authorized to and/or otherwise may be capable of recording and/or proposing (at 402) blocks to blockchain 100, and a second blockchain participant 401-1 may also be authorized to and/or otherwise may be capable of recording and/or proposing (at 404) blocks to blockchain 100. As similarly discussed above, BRN 103 may validate, invalidate, reconcile, and/or perform one or more other remedial measures based on the blocks recorded to and/or proposed by (at 402 and/or 404) blockchain participants 401-1 and 401-2. BRN 103 may perform such operations based on one or more models that associate particular types of value mismatches to particular remedial actions, such as determining whether particular values and/or blocks are valid and/or invalid with respect to other values and/or blocks sharing the same key.

Figure 5:
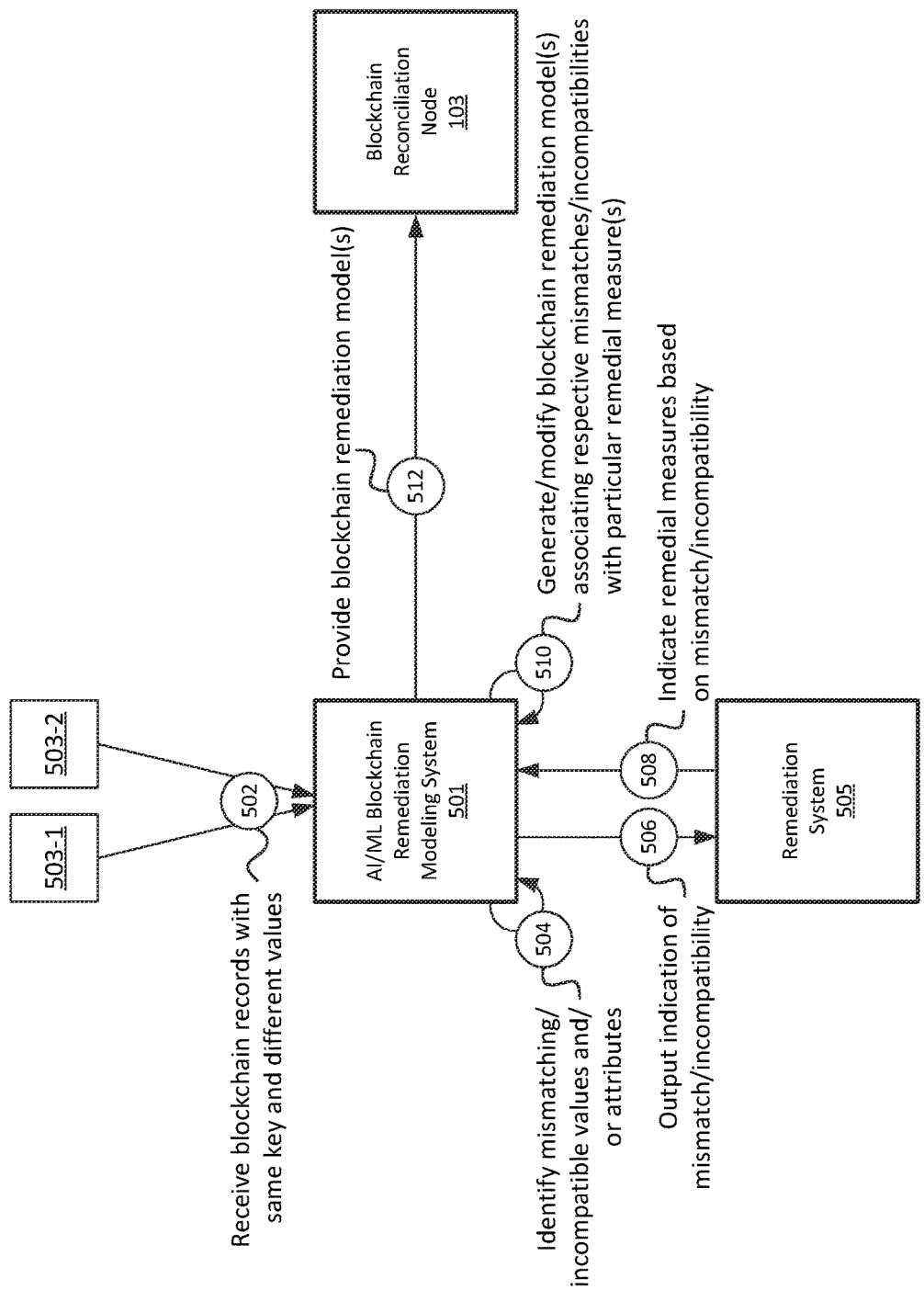
FIG. 5 illustrates an example generation and/or modification of one or more blockchain remediation models, in accordance with some embodiments.

In some embodiments, the models used by BRN 103 may be generated, modified, maintained by BRN 103 and/or by one or more other devices or systems. For example, as shown in FIG. 5, AI/ML Blockchain Remediation Modeling System ("ABRMS") 501 may receive a set of blocks 503, which may include blocks recorded to one or more blockchains 100 and/or information stored within such blocks. Blocks 503-1 and 503-2 may, for example, include information (e.g., parameters, values, etc.) recorded to one or more blockchains 100, and/or proposed to be added to one or more blockchains 100. In this example, blocks 503-1 and 503-2 may be associated with the same key. For example, blocks 503-1 and 503-2 may include an indication of a particular key, and/or ABRMS 501 may identify the key using feature extraction, feature importance, and/or one or more other AI/ML techniques.

ABRMS 501 may further identify (at 504) mismatching values in blocks 503-1 and 503-2 (e.g., one or more values for attributes other than the identified key). For example, as discussed in the example of FIG. 1B, the mismatching values may relate to different vehicle telematics information for the same vehicle over the same time period. As discussed in the example of FIG. 1C, the mismatching values may include a determination that one or more values of block 503-1 may not be possible or may otherwise be incompatible with one or more values of block 503-2, even if such values are associated with different parameters. For example, block 503-1 may indicate that a mobile phone has been returned to a vendor or manufacturer, while block 503-2 may indicate (and/or it may be inferred or determined based on the information included in block 503-2) that a wireless network has allocated resources to providing wireless service to the mobile phone. In some embodiments, such incompatibilities between values of different parameters may be determined based on rules, constraints, logic, etc. provided to ABRMS 501. Additionally, or alternatively, ABRMS 501 may identify such incompatibilities using AI/ML techniques, which may include receiving feedback or identifying the performance of remedial operations when particular sets of values for a first set of parameters are present in one block, while other sets of values for a second set of different parameters are present in another block.

In some embodiments, for example, ABRMS 501 may output (at 506) an indication of a mismatch or incompatibility to Remediation System 505, which may be a device or system associated with performing or identifying remedial measures based on identified mismatches in different blocks. In some embodiments, an operator, administrator, etc. associated with Remediation System 505 may select or identify a particular remedial measure to perform based on the indicated mismatch of values associated with different blocks 503-1 and 503-2 associated with the same key. Additionally, or alternatively, one or more automated processes (e.g., AI/ML processes or other suitable processes) may be used to simulate, test, or otherwise identify a particular remedial measure to take with respect to the identified mismatch. As discussed above, the remedial measure may include determining that values of a particular one of block 503-1 and/or block 503-2 is valid, and suitable recording such information in blockchain 100. In some embodiments, the remedial measures may include determining that some values of block 503-1 are valid (e.g., supersede one or more values of block 503-2), and that some other values of block 503-2 are valid (e.g., supersede one or more values of block 503-1). In such scenarios, the remedial measures may include recording a new block, with some values of block 503-1 and some values of block 503-2. In some situations, Remediation System 505 may determine (or receive an indication) that one or more values should be computed and/or derived from the values of block 503-1 and/or block 503-2 (e.g., an average, median, or other suitable function), and such computed and/or derived values should be recorded to blockchain 100.

Remediation System 505 may indicate (at 508) remedial measures that were performed based on particular mismatches, such that different types of mismatches may be associated with different remedial measures. ABRMS 501 may generate and/or modify (at 510) one or more blockchain remediation models associating respective mismatches with particular remedial measures.

For example, if ABRMS 501 receives (at 508) an indication that the same type of mismatch was remediated in the same way, ABRMS 501 may perform a feature extraction, feature importance analysis, or other suitable procedure to identify how particular types of mismatches are remediated, reconciled, etc. Referring to the example information in FIG. 1B, ABRMS 501 may receive (at 508) multiple instances of information indicating that vehicle telematics data was received from vehicle systems and mobile phones, where such information included mismatches in speed values, acceleration values, etc. ABRMS 501 may identify features, trends, patterns, etc. with how such mismatches were handled by Remediation System 505. In some embodiments, ABRMS 501 may identify that Remediation System 505 tended to select values from blocks with an information source of "Vehicle system" (e.g., instead of an information source of "Mobile phone"). Additionally, or alternatively, ABRMS 501 may identify that Remediation System 505 tended to select higher values of the mismatching attributes. As another example, ABRMS 501 may identify that Remediation System 505 tended to select the "Avg. speed" value associated with the "Vehicle system" information source and tended to select the "Avg. acceleration" value associated with the "Mobile phone" information source.

As another example, referring to the example of FIG. 1C, ABRMS 501 may identify that when an order status of "Returned" was associated with a particular UE ID, Remediation System 505 modified or deleted parameters associated with a different block (e.g., and the same key, such as the same UE ID) associated with network parameters and/or policies associated with the UE ID. In some embodiments, Remediation System 505 may generate or provide one or more rules, constraints, etc. between different parameters and/or values for such parameters, that indicate incompatibilities. In some embodiments, ABRMS 501 may utilize one or more AI/ML techniques or other suitable techniques to generate such rules, constraints, etc., which may be incorporated into the blockchain remediation model(s) generated and/or modified by ABRMS 501.

In some embodiments, different keys or types of keys may be associated with different remedial measures for the same types of mismatches. Referring to the example of vehicle telematics, some makes and/or models of vehicles may be associated with different measures of accuracy or precision, such that vehicle telematics associated with one type of vehicle may be identified as being more precise, reliable, accurate, etc. than vehicle telematics associated with another type of vehicle. Thus, in some scenarios, a mismatch between a first block that includes vehicle telematics received from a vehicle system and a second block that includes vehicle telematics (e.g., for the same vehicle over the same time period) received from another device, such as a mobile phone located within the vehicle, may be associated with a remedial action of selecting the first block for validation, recordation, etc. to blockchain 100. For example, the first block may be associated with a vehicle system that has been determined (e.g., via AI/ML techniques or other suitable techniques) as being associated with a relatively high measure of accuracy, reliability, precision, etc., and/or the second block may be associated with a mobile phone that has been determined (e.g., via AI/ML techniques or other suitable techniques) as being associated with a relatively low measure of accuracy, reliability, precision, etc. (e.g., as compared to the accuracy, reliability, etc. of the vehicle system). In other scenarios, the same type of mismatch may be associated with a remedial action of selecting the second block (e.g., including the vehicle telematics received from the mobile phone) for validation, recordation, etc. to blockchain 100. In such scenarios, the mobile phone may be associated with a higher measure of reliability, accuracy, precision, etc. than the vehicle system.

ABRMS 501 may further provide (at 512) the one or more blockchain remediation models to BRN 103, which may utilize such models to validate, invalidate, and/or otherwise remediate blocks that are added to, or are proposed to be added to, blockchain 100, as discussed above. In this manner, the accuracy and reliability of information stored in blockchain 100 may be enhanced through automated mechanisms, thereby reducing or eliminating the need for manual remediation to be performed when inconsistent, incompatible, mismatching, etc. information is recorded to blockchain 100 for the same key (e.g., the same item, object, timeframe, etc.).

Figure 6:
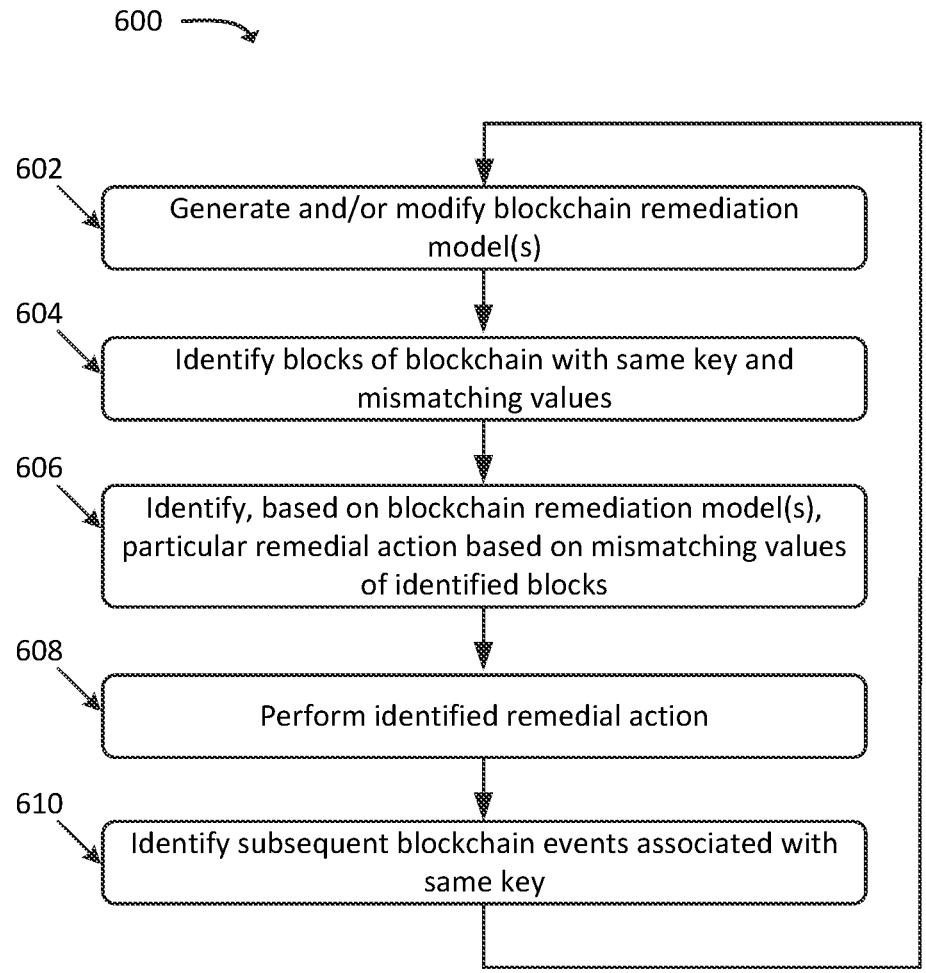
FIG. 6 illustrates an example process for using blockchain remediation models to validate and/or perform remedial actions with respect to blocks proposed or added to a blockchain, in accordance with some embodiments.

FIG. 6 illustrates an example process 600 for using blockchain remediation models to validate and/or perform remedial actions with respect to blocks proposed or added to a blockchain. In some embodiments, some or all of process 600 may be performed by BRN 103. In some embodiments, one or more other devices may perform some or all of process 600 in concert with, and/or in lieu of, BRN 103, such as ABRMS 501 and/or Remediation System 505. For example, while process 600 is described below as being performed by BRN 103, one or more of the operations of process 600 may be performed by ABRMS 501, Remediation System 505, and/or some other device or system.

As shown, process 600 may include generating and/or modifying (at 602) one or more blockchain remediation models. As discussed above, such models may associate particular types of mismatches, incompatibilities, inconsistencies, etc., between particular sets of attributes and/or values for such attributes, with particular remedial actions. The mismatches may include mismatches between values of the same sets of attributes (e.g., different values for the same attributes), mismatches between values of different attributes (e.g., where the values for the different attributes do not meet particular criteria, constraints, thresholds, etc.), and/or other types of mismatches. The remedial actions may include and/or may be based on selecting a particular set of values as valid, selecting a particular set of values as invalid, selecting a subset of a first set of values as valid and a subset of a second set of values as valid, generating a third set of values based on the first and second sets of values (e.g., by performing one or more operations, functions, etc. on the first and second sets of values), or other suitable remedial actions. As discussed above, the one or more blockchain remedial models may be performed using one or more AI/ML techniques or other suitable techniques based on simulations and/or real-world performance of the remedial actions with respect to particular types of mismatches.

Process 600 may further include identifying (at 604) blocks of a blockchain with the same key and with mismatching values. For example, BRN 103 may identify one or more records, blocks, etc. associated with blockchain 100 that are associated with the same key (e.g., the same particular set of values for the same particular set of attributes), and with mismatching values for other attributes. The identified (at 604) blocks may be blocks that are already included in blockchain 100, blocks that are proposed to be added to blockchain 100, and/or a combination of a first block that is already included in blockchain 100 and a second block that is proposed to be added to blockchain 100. In some embodiments, BRN 103 may identify the mismatching values by performing a direct comparison of the values associated with the blocks and identifying one or more values in one block that are not present and/or are different in the other block. In some embodiments, BRN 103 may identify the mismatching values by performing one or more operations, functions, etc. on the values included in the blocks and determining that a result of the operations, functions, etc. do not satisfy a given set of criteria, constraints, thresholds, etc.

Process 600 may additionally include identifying (at 606), based on the one or more blockchain remediation models, a particular remedial action to perform with respect to blockchain 100 based on the mismatching values of the identified blocks. For example, as discussed above, the one or more blockchain remediation models may indicate how to select which set of values are valid, may indicate that one or more operations should be performed on the values of the blocks (e.g., to generate a third set of values), and/or may specify one or more other remedial actions.

Process 600 may also include performing (at 608) the identified remedial action. For example, as discussed above, BRN 103 may select a particular block as "valid" or "authoritative" (e.g., with respect to the other block), may select the values of one block as valid and/or may select the values of the other block as invalid, may compute one or more values based on values present in both blocks, etc. BRN 103 may further add one or more blocks to blockchain 100 based on the determination of which block includes valid values. In some embodiments, BRN 103 may add a third block that includes the values of one of the identified blocks, and/or that includes values computed based on values included in both of the identified blocks. In some embodiments, BRN 103 may add a "corrective" block that refers to one or more of the identified blocks and includes one or more values for the attribute(s) that were identified as having a mismatch.

Process 600 may further include identifying (at 610) subsequent blockchain events associated with the same key. For example, after the remedial action is performed (at 608), BRN 103 may identify subsequent blocks that are recorded to blockchain 100 with the same key as the identified blocks. Such events may include the recording of new values for the same attributes that were identified (at 604) as having a mismatch and were remediated (at 608). This type of event may indicate that the remedial action that was performed (at 608) should be modified or replaced based on the subsequent action. In this manner, the one or more blockchain remediation models may continue to be refined in an iterative process, thus improving the predictive accuracy of the models.

Figure 7:
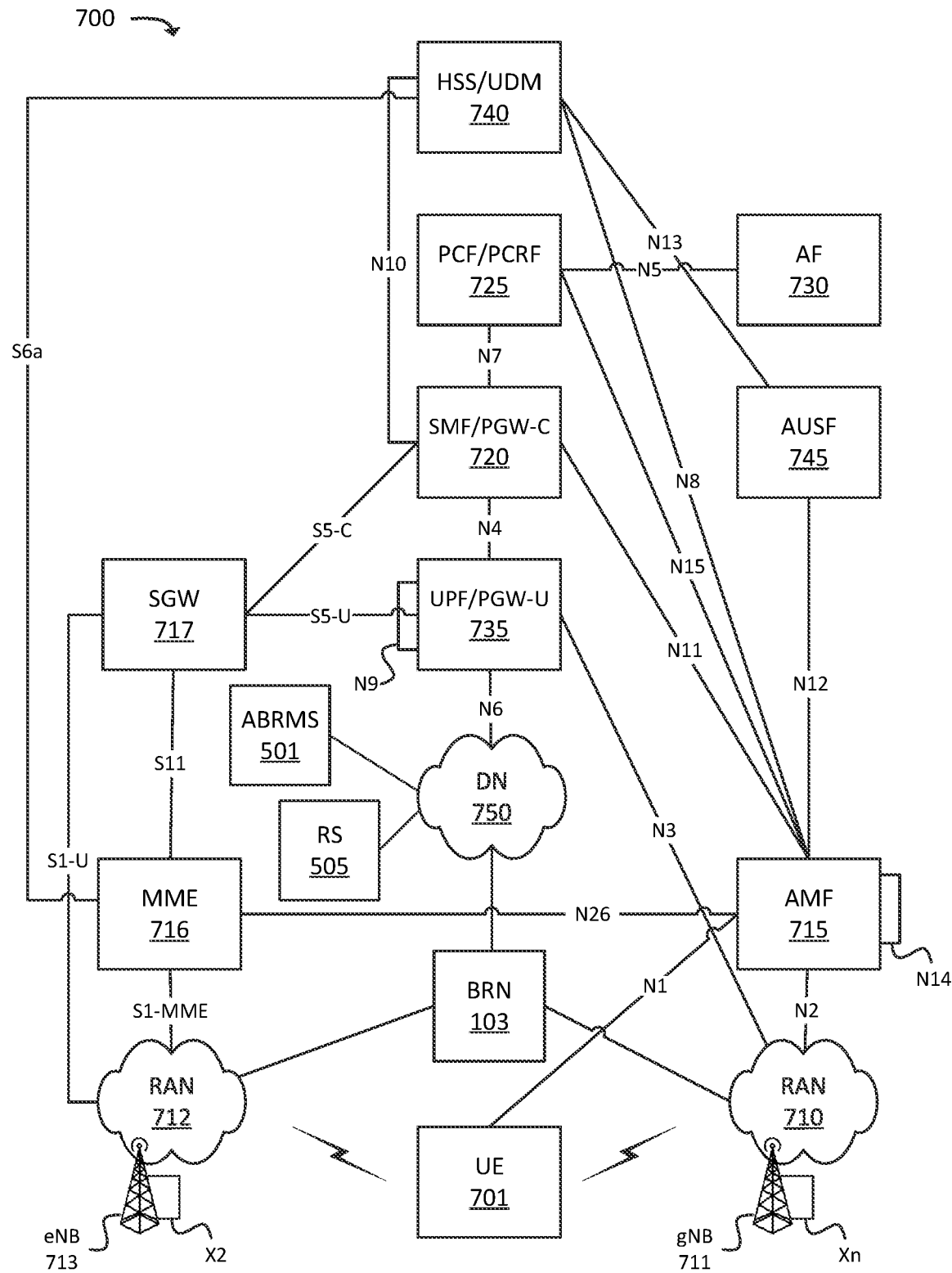
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

Environment 700 may include one or more additional devices or systems communicatively coupled to one or more networks (e.g., DN 750), such as BRN 103, ABRMS 501, and/or Remediation System 505. While shown as separate elements, in some embodiments, one or more of BRN 103, ABRMS 501, and/or Remediation System 505 may be implemented by the same device or system, and/or by the same set of devices.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
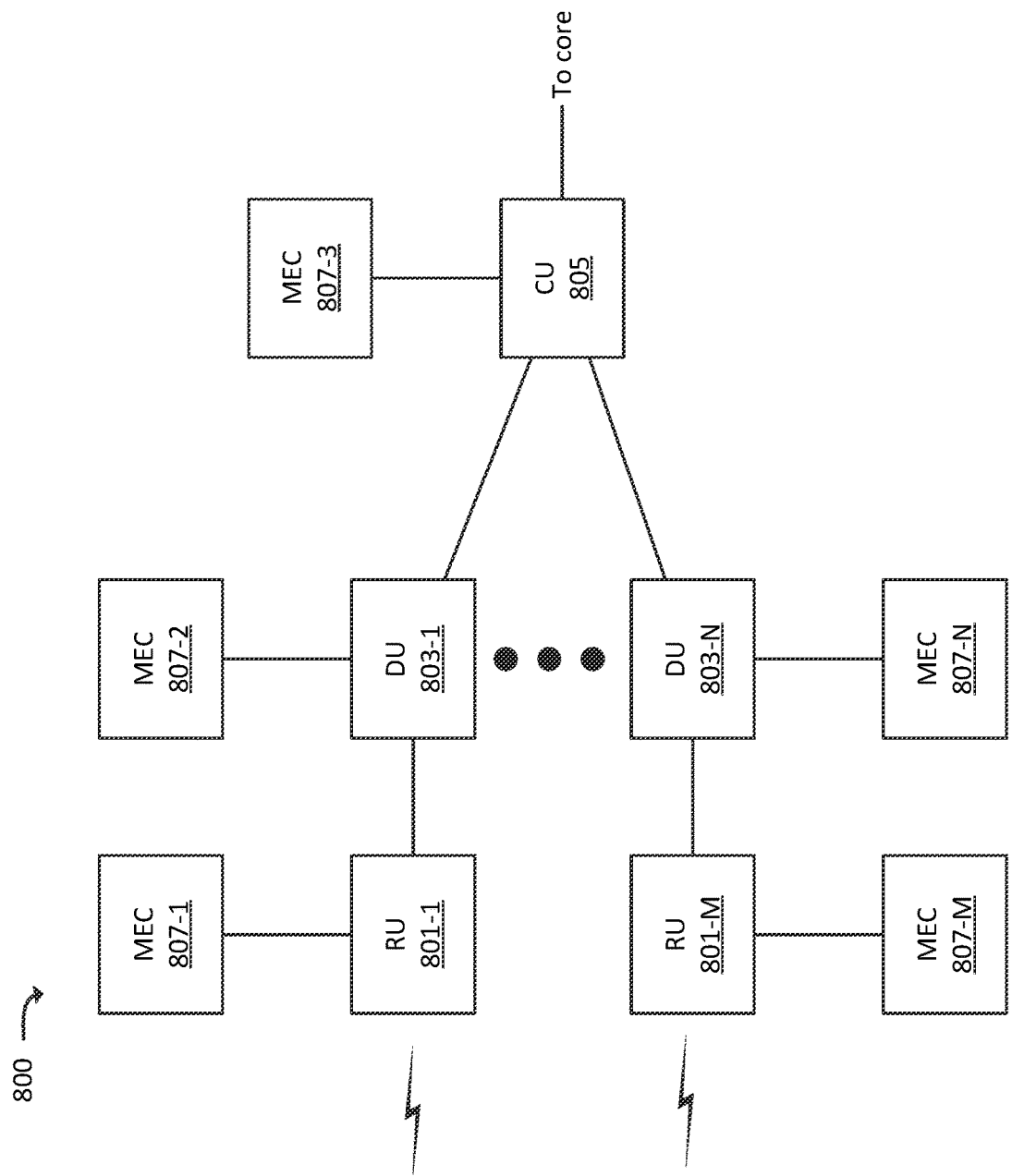
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/ aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to BRN 103, ABRMS 501, and/or Remediation System 505.

Figure 9:
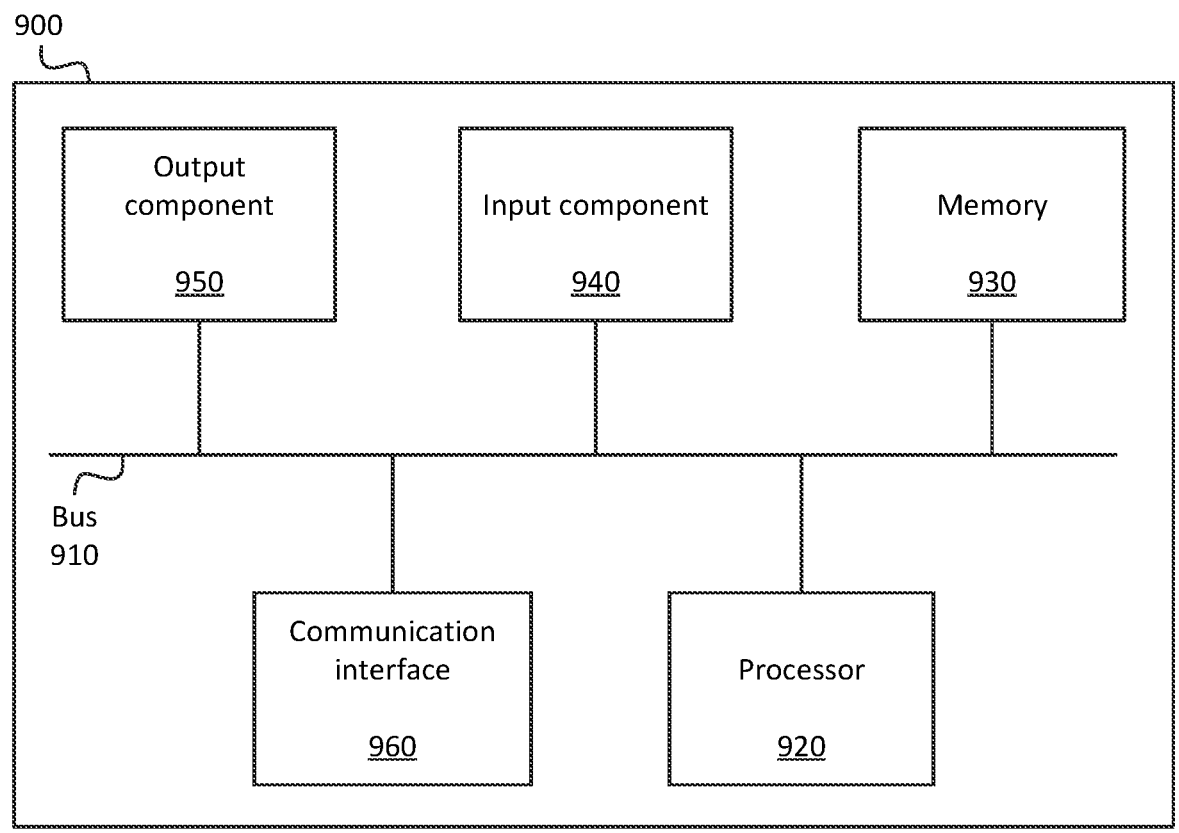
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive one or more models that associate a plurality of types of mismatches between different sets of values to a plurality of different remedial actions;
identify a first block associated with a blockchain, wherein the first block includes a particular key and a first set of values for a particular set of attributes;
identify a second block associated with the blockchain, wherein the second block includes the particular key and a second set of values for the particular set of attributes;

identify that the first and second blocks are associated with the same particular key and are further associated with a particular type of mismatch between the first set of values for the particular set of attributes and the second set of values for the particular set of attributes;

determine, based on the one or more models, a particular remedial action, of the plurality of remedial actions, that is associated with the identified particular type of mismatch; and perform the particular remedial action with respect to the blockchain based on the identified mismatch between the first set of values associated with the first block and the second set of values associated with the second block, wherein performing the particular remedial action includes:

generating a third set of values based on the first set of values and the second set of values, and recording a third block to the blockchain, wherein the third block includes the third set of values and the particular key.

2. The device of claim 1, wherein the particular type of mismatch is a first type of mismatch, wherein the one or more processors are further configured to:

identify a second type of mismatch between a fourth set of values associated with a fourth block of the blockchain and a fifth set of values associated with a fifth block of the blockchain;

determine, based on the one or more models, a second remedial action, of the plurality of remedial actions, that is associated with the identified second type of mismatch, wherein the second remedial action is different from the first remedial action; and perform the second remedial action with respect to the blockchain based on the identified mismatch between the fourth set of values associated with the fourth block and the fifth set of values associated with the fifth block.

3. The device of claim 2, wherein the particular key is a first key, wherein the one or more processors are further configured to:

identify that the fourth and fifth blocks are associated with a second key, wherein identifying the second type of mismatch is further based on identifying that the fourth and fifth blocks are associated with a second key.

4. The device of claim 1, wherein performing the remedial action includes at least one of:

determining that the first block includes valid information with respect to the blockchain, or determining that the second block includes invalid information with respect to the blockchain.

5. The device of claim 4, wherein performing the remedial action includes at least one of:

facilitating a recordation of the first block to the blockchain, or outputting an indication that the second block should not be recorded to the blockchain.

6. The device of claim 1, wherein the particular set of attributes is a first set of attributes, wherein the key includes a fourth set of values for a second set of attributes.

7. The device of claim 1, wherein generating the third set of values includes performing a particular function on the first set of values and the second set of values to generate the third set of values.

8. A non-transitory computer-readable medium, storing a plurality of processor-executable instructions to:

receive one or more models that associate a plurality of types of mismatches between different sets of values to a plurality of different remedial actions;

identify a first block associated with a blockchain, wherein the first block includes a particular key and a first set of values for a particular set of attributes;

identify a second block associated with the blockchain, wherein the second block includes the particular key and a second set of values for the particular set of attributes;

identify that the first and second blocks are associated with the same particular key and are further associated with a particular type of mismatch between the first set of values for the particular set of attributes and the second set of values for the particular set of attributes;

determine, based on the one or more models, a particular remedial action, of the plurality of remedial actions, that is associated with the identified particular type of mismatch; and perform the particular remedial action with respect to the blockchain based on the identified mismatch between the first set of values associated with the first block and the second set of values associated with the second block, wherein performing the particular remedial action includes:

generating a third set of values based on the first set of values and the second set of values, and recording a third block to the blockchain, wherein the third block includes the third set of values and the particular key.

9. The non-transitory computer-readable medium of claim 8, wherein the particular type of mismatch is a first type of mismatch, wherein the plurality of processor-executable instructions further include processor-executable instructions to:

identify a second type of mismatch between a fourth set of values associated with a fourth block of the blockchain and a fifth set of values associated with a fifth block of the blockchain;

determine, based on the one or more models, a second remedial action, of the plurality of remedial actions, that is associated with the identified second type of mismatch, wherein the second remedial action is different from the first remedial action; and perform the second remedial action with respect to the blockchain based on the identified mismatch between the fourth set of values associated with the fourth block and the fifth set of values associated with the fifth block.

10. The non-transitory computer-readable medium of claim 9, wherein the particular key is a first key, wherein the plurality of processor-executable instructions further include processor-executable instructions to:

identify that the fourth and fifth blocks are associated with a second key, wherein identifying the second type of mismatch is further based on identifying that the fourth and fifth blocks are associated with a second key.

11. The non-transitory computer-readable medium of claim 8, wherein performing the remedial action includes at least one of:

determining that the first block includes valid information with respect to the blockchain, or determining that the second block includes invalid information with respect to the blockchain.

12. The non-transitory computer-readable medium of claim 11, wherein performing the remedial action includes at least one of:
- facilitating a recordation of the first block to the blockchain, or
- outputting an indication that the second block should not be recorded to the blockchain.

13. The non-transitory computer-readable medium of claim 8, wherein the particular set of attributes is a first set of attributes, wherein the key includes a fourth set of values for a second set of attributes.

14. The non-transitory computer-readable medium of claim 8, wherein generating the third set of values includes performing a particular function on the first set of values and the second set of values to generate the third set of values.

15. A method, comprising:
- receiving one or more models that associate a plurality of types of mismatches between different sets of values to a plurality of different remedial actions;
- identifying a first block associated with a blockchain, wherein the first block includes a particular key and a first set of values for a particular set of attributes;
- identifying a second block associated with the blockchain, wherein the second block includes the particular key and a second set of values for the particular set of attributes;
- identifying that the first and second blocks are associated with the same particular key and are further associated with a particular type of mismatch between the first set of values for the particular set of attributes and the second set of values for the particular set of attributes;
- determining, based on the one or more models, a particular remedial action, of the plurality of remedial actions, that is associated with the identified particular type of mismatch; and
- performing the particular remedial action with respect to the blockchain based on the identified mismatch between the first set of values associated with the first block and the second set of values associated with the second block, wherein performing the particular remedial action includes:
  - generating a third set of values based on the first set of values and the second set of values, and
  - recording a third block to the blockchain, wherein the third block includes the third set of values and the particular key.

16. The method of claim 15, wherein the particular type of mismatch is a first type of mismatch, wherein the particular key is a first key, the method further comprising:
- identifying that fourth and fifth blocks of the blockchain are associated with a second key;
- identifying, based on identifying that the fourth and fifth blocks are associated with the second key, a second type of mismatch between a fourth set of values associated with the fourth block of the blockchain and a fifth set of values associated with the fifth block of the blockchain;
- determining, based on the one or more models, a second remedial action, of the plurality of remedial actions, that is associated with the identified second type of mismatch, wherein the second remedial action is different from the first remedial action; and
- performing the second remedial action with respect to the blockchain based on the identified mismatch between the fourth set of values associated with the fourth block and the fifth set of values associated with the fifth block.

17. The method of claim 15, wherein performing the remedial action includes at least one of:
- determining that the first block includes valid information with respect to the blockchain, or
- determining that the second block includes invalid information with respect to the blockchain.

18. The method of claim 17, wherein performing the remedial action includes at least one of:
- facilitating a recordation of the first block to the blockchain, or
- outputting an indication that the second block should not be recorded to the blockchain.

19. The method of claim 15, wherein the particular set of attributes is a first set of attributes, wherein the key includes a third set of values for a second set of attributes.

20. The method of claim 15, wherein generating the third set of values includes performing a particular function on the first set of values and the second set of values to generate the third set of values.

* * * * *